United States Patent [19]

Mathyssek et al.

[11] Patent Number: 4,589,897
[45] Date of Patent: May 20, 1986

[54] METHOD FOR THE MANUFACTURING OF A FIBER WITH A TAPERED END HAVING A REFRACTIVE LENS

[75] Inventors: Konrad Mathyssek, Zorneding; Rudolf Keil, Munich, both of Fed. Rep. of Germany

[73] Assignee: Siemens Aktiengesellschaft, Berlin & Munich, Fed. Rep. of Germany

[21] Appl. No.: 704,176

[22] Filed: Feb. 22, 1985

[30] Foreign Application Priority Data

Mar. 2, 1984 [DE] Fed. Rep. of Germany ......... 340820

[51] Int. Cl.$^4$ ............................................. C03B 21/06
[52] U.S. Cl. .......................................... 65/2; 65/10.2; 65/105; 65/112
[58] Field of Search ................... 65/2, 13, 105, 112, 65/10.2, 37

[56] References Cited

U.S. PATENT DOCUMENTS 3,684,474 8/1972 Chisholm ........................ 65/112 X

FOREIGN PATENT DOCUMENTS 3034873 3/1982 Fed. Rep. of Germany .
53-144348 12/1978 Japan .
55-88012 7/1980 Japan ........................ 65/2
56-25703 3/1981 Japan .................................. 65/10.2
56-57017 5/1981 Japan .

OTHER PUBLICATIONS

Kuwahara et al., "Efficient Coupling for Semi-Conductor Lasers into Single-Mode Fibers with Tapered Hemispherical Ends", Applied Optics, vol. 19, #15, Aug. 1, 1980, pp. 2578–2583.

Primary Examiner—Robert Lindsay
Attorney, Agent, or Firm—Hill, Van Santen, Steadman & Simpson

[57] ABSTRACT

A method for manufacturing a fiber taper with a refractive lens, said method comprising the steps of placing a fiber in an axial tension of a given amount; locally heating a portion of the fiber under tension to cause softening and the formation of a constriction in the fiber in the area of heating; removing the tension and continuing the heating to raise the temperature to a point at which the viscosity of the heated material is such that the surface tension causes a further constriction and a transverse separation of the fiber at the constriction; continuing the heating to form the desired curvature of the lens on the separated ends; and then after the desired curvature is formed, stopping the heating to enable the ends to cool and solidify.

4 Claims, 4 Drawing Figures

METHOD FOR THE MANUFACTURING OF A FIBER WITH A TAPERED END HAVING A REFRACTIVE LENS

BACKGROUND OF THE INVENTION

The present invention is directed to a method for the manufacture of a fiber with a tapered end having a refractive lens. In particular, a method wherein a fiber is heated while subjected to tensile forces to create a constriction therein, severed at the constriction to form two fibers having tapered ends and then melting the severed fiber to form the refractive lenses.

Transition modules, which have the highest possible incoupling efficiency of a semiconductor laser light into a monomode fiber and at the same time reflect little light back into the laser, are required in optical communication technology with monomode glass fibers. These demands are excellenty met by means of a coupling optics, which consist of a fiber with a tapered end having a refractive lens at the tapered end of the tapered fiber. The refractive lens can be produced by means of melting, for example, melting around the tapered end of a fiber taper as disclosed in an article by H. Kuwahara, S. Sasaki, and N. Tokoyo, "Efficient Coupling from Semiconductor Lasers into Single-Mode Fibers with Tapered Hemispherical Ends", *Applied Optics*, Vol. 19, No. 15, Aug. 1, 1980, pp. 2578-2583.

In order to manufacture such a fiber taper with refractive lens, one can proceed such that a stretched fiber is locally or topically heated up to the softening point of the glass so that a permanent constriction of the fiber will occur. Then the tension is removed before the fiber tears at the constriction. The constricted fiber is cut at a specific point of the constriction by means of a cutting tool. Then the refractive lens is melted or joined to the tapered end of at least one of the two fiber tapers such as by being melted thereon in a further work step.

SUMMARY OF THE INVENTION

The object of the present invention is to provide a method to form a fiber with a tapered end having a refractive lens which can be produced in a relatively simple fashion.

To obtain this object, the present invention is directed to an improvement in the method for the manufacture of a fiber with a tapered end having a refractive lens comprising the steps of forming a constriction in a fiber, then severing the fiber at the constriction and melting the severed fiber to form the refractive lenses. The improvements are that the steps of severing the constriction and the melting of the severed ends of the tapered fiber occur as a single operation by locally heating the constriction of the fiber while the fiber is held substantially tension-free or under a very low axial tension to a very high temperature at which the softened fiber material has a low viscosity so that the surface tension of the low viscosity of the softened material has a deforming effect, continually heating until the fiber parts by itself in the low viscosity region under the influence of the surface tension and a desired curved lens surface is formed at least on one of the low fiber ends, then terminating the heating to maintain the desired curvature for the lens. It should be pointed out that either aspherical or spherical curvatures can be formed in this manner.

Given the inventive method, the constriction is merely heated and the heating is not disengaged until after the fiber has separated itself in the low viscosity, softened region and the separated end assumes the desired lens shape whereby an aspherical or a spherical lens can be obtained by means of proper selection of the disengagement time. The advantage of an aspherical lens consists in the better matching of the laser spot to the mode of the monomode fiber so that a significant increase in the coupling efficiency will occur.

Preferably, the step of forming the constriction in the fiber comprises placing the fiber under a given axial tension, heating the fiber at a topical or local position while maintaining the tension so that the heated fiber is drawn into the constriction. As the constriction is formed, the axial tensile forces are removed or at least greatly reduced and the topical heating is maintained to form the combined steps of severing and forming the lens surfaces.

Preferably, the topical or local heating of the fiber is obtained by electrical arc heating.

BRIEF DESCRIPTION OF THE DRAWINGS

FIG. 3 is a profile of the constriction of the fiber indicated within the circle III of FIG. 1; and FIG. 4 is an enlarged view of a tapered end formed by the method of the present invention.

DESCRIPTION OF THE PREFERRED EMBODIMENTS

The principles of the present invention are particularly useful in forming the glass fiber having a tapered end 131 with a spherical or aspherical lens 133 as illustrated in FIG. 4.

Figure 1:
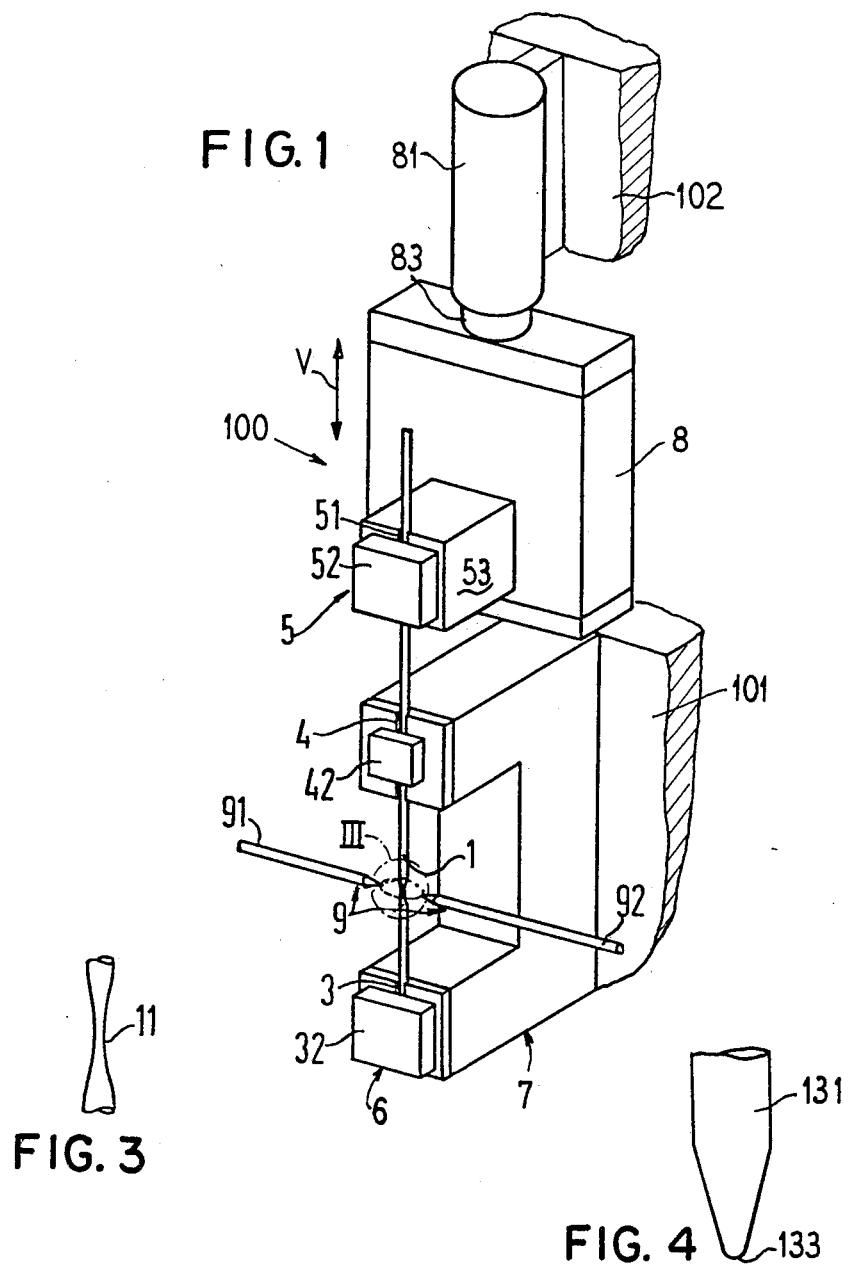
FIG. 1 is a schematic illustration of an apparatus for practicing the method in accordance with the present invention.

The apparatus for implementing the method is illustrated in FIG. 1 by the apparatus 100. The apparatus 100 is substantially similar to the apparatus for manufacturing constrictions in fibers which is described in our earlier patent application U.S. Ser. No. 642,583, filed Aug. 20, 1984, which was based on German Patent Application No. P 33 34 565. It should be pointed out that a more detailed description of the apparatus is contained in the above-mentioned copending U.S. application and is incorporated by reference thereto.

The apparatus 100 has a support 7 that is mounted on a frame member 101 and positions two exactly coaxially aligned guide grooves 3 and 4. A fiber 1 is positioned in the aligned guide grooves 3 and 4 and held therein by magnets 32 and 42.

The magnet 32 holds the fiber 1 pinched fast in the groove 3 whereas a weaker magnet 42 allows the fiber to slide in the groove 4. The fiber 1 is placed under axial tension while in the grooves 3 and 4 with a limited frictional force which is lower than the clamping force exerted on the fiber 1 by the magnet 32. The placing of the tension force on the fiber 1 is accomplished by a sliding clutch or limited force-applying device 5 which acts on the fiber at a position outside of the range engaged in the grooves 3 and 4.

The sliding clutch 5 consists, for example, of a groove 51 on a member 53 and a magnet 52. The member 53 is on a sliding table 8 which is moved in a vertical direction indicated by the double arrow V by being attached to a shaft 83 of a motor 81 which is connected to another frame member 102 that is rigidly mounted with respect to the frame member 101.

As mentioned hereinabove, the magnet 42 is weaker than the magnet 32 so that the fiber will slide in the groove 4 before it slides in the groove 3. In a similar manner, the magnet 52 is weaker than the magnet 32, however, it is stronger than the magnet 42. Thus, movement of the member 8 in an upward vertical direction will apply a given tension to the fiber 1, which tension is dependent on the gripping force of the magnet 52.

The device 100 also has a heating device or arrangement 9 which will heat the fiber 1 between the exactly aligned guide grooves 3 and 4. As illustrated, the heating device consists of, for example, an alternating current arc means between two electrodes 91 and 92 which are positioned so that the fiber extends therebetween. These electrodes will provide a local or topical heating of the fiber.

Dynamically balanced constrictions or tapers with defined parameters can be reproducibly produced with the apparatus 100 of FIG. 1. In order to produce such tapers, this apparatus is operated such that the sliding clutch 5 is moved away from the grooves 4 by means of a traction motor 81 or some other suitable drive. The fiber 1 slides through the clutch because the traction of the traction motor is greater than the limited frictional force exerted by the sliding clutch 5.

Figure 2:
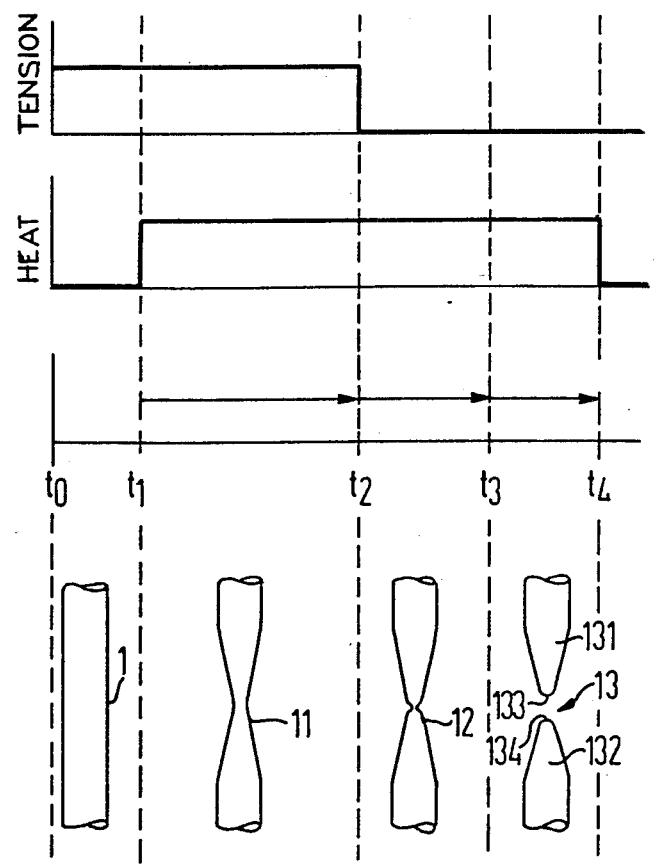
FIG. 2 is a flow chart illustrating the application of the tensile forces, heat and the shape of the workpiece during different steps of the method.

Referring to FIG. 2 which shows a flow of the method, the fiber 1 is placed in the two aligned grooves 3 and 4 and held by the respective magnets 32 and 42 as well as by the sliding clutch 5. This is at a time $t_0$ at which the traction motor 81 is energized to start moving to apply the tensile force on the fiber 1. At a time $t_1$ when the fiber is already at a predetermined axial tension and sliding through the clutch 5, the arc of the heating device 9 is switched on. The fiber 1 then is topically or locally softened between the grooves 3 and 4 with the consequence being that the sliding clutch regrips the fiber and the softened fiber is stretched to provide a constriction 11 in the softened region.

When a specific constriction diameter is achieved, the arc has been heretofore shut off with the consequence being that the softened region of the fiber will quickly cool, become hard and the fiber thus slides through the sliding clutch 5 which continues to be pulled by the traction motor 81. The result was a constriction 11 in the fiber 1 as is shown in FIGS. 2 and 3.

One proceeds differently from the manufacture of tapers with refractive lenses. It is not the arc that is shut down but rather the traction motor that moves the sliding clutch 1. This shutdown likewise occurs when the constriction 11 has assumed the desired diameter or desired shape in the softened region of the fiber 1, for example, at a time $t_2$. As a result of this shutdown of the traction motor, the softened region of the fiber with the constriction 11 is no longer stretched any further but due to the continuous engagement of the arc, the constriction 11 is brought to such a high temperature that the softened material will have a very low viscosity so that the surface tension of the material has a deforming effect.

This surface tension acts such that another local constriction 12 occurs in the constriction 11 that was already present. This further constriction 12 tends to transversely separate the first constriction 11. The constriction of the fiber with the rising further local constriction is illustrated at position 12 in FIG. 2.

The phase of the further local constriction 12 is concluded with the complete transversal parting or separation of the constriction which may occur at time $t_3$. The phase of melting the refractive ends at the parted taper begins at this time. To that end, the arc remains engaged beyond the time $t_3$ so that the fiber material at the ends of the separated tapers retain such a low viscosity that the surface tension of the material of the fiber continues to have a deforming effect.

In this phase of melting the refractive lens, the configuration 13 with the two separate tapers 131 and 132 is obtained and each of the separate tapers has a rounded end. When the desired aspherical or spherical curvature 133 and 134, respectively, have occurred on the ends of at least one of the tapers such as 131 or 132, respectively, then the arc is disengaged or turned off, for example, at a time $t_4$. With the disconnection of the arc, the manufacture of the tapers with the melted or joined refractive lens has been concluded.

The above-described example clearly shows how a fiber taper with the refractive lens can be produced in one single operation in one and the same apparatus.

The limited tensile force with which the fiber is stretched during the formation of the constriction need not be completely removed after the formation of the desired constriction. A low tension on the fiber can be maintained, for example, at an axial tensile force of less than 1 mN.

Although various minor modifications may be suggested by those versed in the art, it should be understood that we wish to embody within the scope of the patent granted hereon, all such modifications as reasonably and properly come within the scope of our contribution to the art.

We claim:

1. In a method for manufacturing a glass optical fiber with a tapered end having a refractive lens comprising the step of forming a constriction in a fiber, then separating the fiber at the constriction to form fibers with severed ends and melting the severed ends to form the refractive lenses, the improvement comprising the steps of separating the fiber at the constriction and melting the severed ends to form the lenses occurring in a single operation by means of locally heating the constriction of the fiber held substantially free of tension to heat the constriction to a high temperature at which the softened material of the fiber has such a low viscosity that the surface tension of the softened material has a deforming effect, said heating utilizing an alternating electronic arc, continuing the heating until the surface tension of the heated material causes a transverse severing in the area of the constriction and the forming of a desired curvature for the lens to occur, and then subsequent to forming the desired curvature for the lens, terminating the heating.

2. In a method according to claim 1, wherein the one operation also accomplishes the step of forming the constriction, said step of forming the constriction including placing the fiber under a given amount of axial tension, locally heating the fiber under tension to create the constriction, removing the tension force when the desired constriction is obtained and then continuing the heating to obtain the separation and forming of the refractive lens.

3. A method of manufacturing a glass optical fiber with a tapered end having a refractive lens, said method comprising the steps of placing a fiber in a desired amount of axial tension, locally heating a portion of the fiber under axial tension to cause a softening in a local area, continuing the heating and tension to cause a pulling of the fiber into a constriction, removing the tension and continuing the heating to heat the constricted portion to a high temperature at which the softened material of the constriction portion has a low viscosity so that the surface tension causes a second constriction to be formed, continuing the heating until the second constriction formed by the surface tension causes a separation of the fiber into two taper ends, and continuing the heating to obtain the desired curvature for the lens on the end of each of said severed ends, and then with the obtaining of the desired curvature, removing the heating to allow the ends to harden with the tapered configuration terminating in a refractive lens.

4. A method according to claim 3, wherein the step of heating comprises utilizing an alternating electrical arc.

* * * * *